Patented June 4, 1935

2,003,641

UNITED STATES PATENT OFFICE 2,003,641

PRINTING OF TEXTILE FABRICS WITH VAT DYESTUFFS

Hermann Berthold, Leverkusen-on-the-Rhine, Carl Krauss, Frankfort-on-the-Main-Fechenheim, and Alfred Hagenböcker, Frankfort-on-the-Main-Hochst, Germany, assignors to General Aniline Works, Inc., New York, N. Y., a corporation of Delaware No Drawing. Application May 29, 1930, Serial No. 457,522. In Germany June 4, 1929

5 Claims. (Cl. 8—6)

The present invention relates to a process of manufacturing dyestuff preparations valuable for use in textile printing, to the preparations obtainable by said process and to printings obtainable by the use of said preparations.

The process of manufacture of our new dyestuff preparations is by reducing with a reducing agent customarily employed in vat dyeing, such as sodium hydrosulfite, iron carbonyl, titanium trichloride and the like, a vat dyestuff in the presence of water and glycerine or another similar water soluble alcohol, such as ethyl alcohol, glycol, thiodiglycol, thiodiglycerol, (obtainable by reacting with sodium sulfide upon monochlorohydrine), ethylene glycol and the like, with the addition of ammonia. Mixtures of such alcohols and finally also the crude materials available in commerce, such as among others, crude glycerine lyes, crude saponification glycerine and dynamite glycerine can be employed for the manufacture of the dyestuff preparations. The preparations thus obtainable contain the reduced dyestuff in a water insoluble form (free leuco acid or isomerics of the normal leuco derivative). They are stable to air to a far reaching extent and can be worked up to valuable printing pastes even after a prolonged storage with the effect of yielding very strong and good fixing printings. This effect is generally increased by the addition to these preparations of one or more hydrotropically acting substances before, during or after reduction. The term "hydrotropically acting substances" is intended to define all substances, which are capable of rendering substances soluble in water, which substances per se are insoluble in water. (Compare Neuberg, Journ. of the Americ. Chem. Soc., Chemical Abstracts, vol. 11, (1917) pages 256 and 1437, and Tamba, vol. 19 (1925) page 84).

The dyestuff preparations thus obtainable are of particular value for the printing of textile products for the following reasons:—

Generally these preparations, probably on account of the stabilizing influence of the alcohol together with the salts resulting from the reduction, are rather stable towards atmospheric oxygen. Furthermore, the printings which are obtainable by employing these dyestuff preparations after working up to printing pastes in the usual manner, are in most cases much stronger and fix better than the printings produced according to the customary processes.

In addition, the crude dyestuffs can in many cases of working by this method also be used without previous pasting, whereby the otherwise necessary costly pasting of the dyestuffs can be avoided. It should further be mentioned that the preparations obtainable in accordance with the present process are very stable, they do not dry up or form encrustations, they also do not congeal, the solution does not separate or lead to deposits.

As hydrotropically acting agents we prefer ammonium or alkali metal salts of sulfonic and carboxylic acids of the benzene or naphthalene series, hydrogenation products or such derivatives thereof, as are substituted by alkyl, hydroxy or dialkylamino groups, but it should be noted that we do not intend to restrict our invention to these compounds nor to the compounds specially enumerated by Neuberg or Tamba, but that all those substances which comply with the definition of the word "hydrotropically acting agent" as given above, are within the scope of our invention. As examples of such substances the following may be mentioned: Urea, substituted ureas, thiourea, hexamethylenetetramine, the potassium salt of ethylether sulfonic acid, potassium or sodium isovalerate, the ammonium or alkali metal salts of the following acids: isobutyric acid, phenylacetic acid, benzoic acid, ortho-toluene carboxylic acid, salicylic acid, the benzene sulfinic acids, 1.4-toluene sulfinic acid, para-toluene sulfonic acid, the benzene sulfonic acids, naphthalene sulfonic acids, e. g., naphthalene-1-or -2-sulfonic acid, aniline sulfonic acids and substitution products thereof, such as for example, di-methyl-or ethyl-metanilic acid, dimethyl-2-toluidine-4-sulfonic acid, alkali metal salts of picolinic acid, alkali metal salts of hydroaromatic carboxylic and sulfonic acids, as for example the cyclohexane carboxylic acid, tetrahydro-naphthalene-beta-sulfonic acid and the like.

The dyestuff preparations above mentioned may be worked up to printing pastes in the usual manner, e. g., by the addition of thickenings, wheat starch, British gum powder, sodium formaldehyde sulfoxylate, potassium carbonate and the like. Printing with these printing pastes may be performed, e. g., with the aid of a printing engine, whereupon the printings are dried to a certain extent, steamed with wet steam (e. g. in a Mather-Platt apparatus) and developed by oxidation, e. g., with an aqueous solution of an alkali metal bichromate and acetic acid, rinsed and soaped while boiling. It will also be possible to use our dyestuff preparations for slop-padding processes.

The following example will illustrate our invention without limiting it thereto, the parts being by weight.

*Example*

50 parts of the dyestuff according to Example 2 of the U. S. Pat. 1,537,928 (i. e., 9-chloro-1.2-naphthoxy-thiophene-5'-bromo-2.2'-indolindigo) are reduced in 300 parts of water, 100 parts of glycerine 88% and 88 parts of ammonia (25%) with 20 parts of sodium hydrosulfite and the mixture is then evaporated with the addition of 12.5 parts of sodium dimethyl-sulfanilate to 250 parts, that is to say, to a paste of 20% dyestuff content. The preparation gives a more complete black with better fixing than the dyestuff only suspended in water.

Instead of glycerine other similar organic alcohols soluble in water, such as diethylene-glycol may be used.

When applying the dyestuff above mentioned together with rather small amounts (e. g. about 5-10%) of a yellow or orange vat dyestuff, especially beautiful black shades are obtainable.

We claim:—

1. Process of preparing a water-insoluble leuco compound of a vat dyestuff which leuco compound is stable to air, which comprises reducing a halogenated-1.2-naphthoxythiophene - halogenated-2.2'-indolindigo with a reducing agent customarily employed in vat dyeing and effective with weak alkali, in the presence of water, ammonia, and a water-soluble alcohol.

2. The process defined in claim 1, in which the dyestuff being subjected to reduction is 9-chloro-1.2-naphthoxythiophene-5'-bromo-2.2'-indolindigo.

3. The process defined in claim 1, in which the reducing agent employed is sodium hydrosulphite.

4. The process defined in claim 1, in which the water-soluble alcohol is glycerine.

5. The process defined in claim 1, in which the reduction is carried out in the presence also of a hydrotropic agent.

HERMANN BERTHOLD.
CARL KRAUSS.
ALFRED HAGENBÖCKER.